(12) United States Patent
Mase

(10) Patent No.: US 9,232,036 B2
(45) Date of Patent: Jan. 5, 2016

(54) CASE FOR AN ELECTRONIC DEVICE

(75) Inventor: Ryoichi Mase, Tokyo (JP)

(73) Assignee: POWER SUPPORT CO., LTD., Tokyo (JP)

( * ) Notice: Subject to any disclaimer, the term of this patent is extended or adjusted under 35 U.S.C. 154(b) by 0 days.

(21) Appl. No.: 12/939,905

(22) Filed: Nov. 4, 2010

(65) Prior Publication Data

US 2011/0315579 A1    Dec. 29, 2011

(30) Foreign Application Priority Data

Jun. 28, 2010 (JP) .................................. 2010-4757
Jul. 2, 2010 (JP) .................................. 2010-4899
Jul. 9, 2010 (JP) .................................. 2010-5065

(51) Int. Cl.
    *H04M 1/00*        (2006.01)
    *H04M 1/04*        (2006.01)

(52) U.S. Cl.
    CPC ...................................... *H04M 1/04* (2013.01)

(58) Field of Classification Search
    CPC ...................................................... H04M 1/04
    USPC ........... 206/316.1, 316.2, 320, 775, 776, 777; 455/575.1, 575.8; 348/373, 375, 376, 348/273, 274, 275, 276; 379/433.11
    See application file for complete search history.

(56) References Cited

U.S. PATENT DOCUMENTS

| | | | | |
|---|---|---|---|---|
| 1,429,762 A * | 9/1922 | Oliver | | 362/355 |
| 4,253,737 A * | 3/1981 | Thomsen et al. | | 359/614 |
| 4,834,330 A * | 5/1989 | Swillinger | | 248/205.2 |
| 5,146,251 A * | 9/1992 | Ishii et al. | | 396/176 |
| 5,907,721 A * | 5/1999 | Schelling et al. | | 396/27 |
| 6,014,522 A * | 1/2000 | Reber, II | | 396/29 |
| 6,574,428 B2 * | 6/2003 | Nagasaka et al. | | 396/6 |
| 6,646,864 B2 * | 11/2003 | Richardson | | 361/679.3 |
| 6,941,066 B2 * | 9/2005 | Kawakami | | 396/27 |
| 6,980,777 B2 * | 12/2005 | Shepherd et al. | | 455/90.3 |
| 7,581,893 B2 * | 9/2009 | Miramontes | | 396/448 |
| 7,612,997 B1 * | 11/2009 | Diebel et al. | | 361/679.56 |
| 8,047,364 B2 * | 11/2011 | Longinotti-Buitoni | | 206/320 |
| 8,286,789 B2 * | 10/2012 | Wilson et al. | | 206/320 |
| 8,342,325 B2 * | 1/2013 | Rayner | | 206/320 |
| 8,509,864 B1 * | 8/2013 | Diebel | | 455/575.8 |
| 2002/0159586 A1 * | 10/2002 | Chiou | | 379/433.11 |
| 2005/0022924 A1 * | 2/2005 | Blackburn | | 156/230 |
| 2006/0186001 A1 * | 8/2006 | Anderson et al. | | 206/320 |
| 2008/0247750 A1 * | 10/2008 | Law et al. | | 396/535 |
| 2008/0273117 A1 * | 11/2008 | Nilsson | | 348/552 |
| 2009/0114556 A1 * | 5/2009 | Tai et al. | | 206/320 |
| 2010/0096284 A1 * | 4/2010 | Bau | | 206/320 |
| 2011/0255000 A1 * | 10/2011 | Weber et al. | | 348/374 |
| 2011/0284407 A1 * | 11/2011 | Connolly | | 206/320 |
| 2011/0287812 A1 * | 11/2011 | Joo | | 455/566 |
| 2011/0309728 A1 * | 12/2011 | Diebel | | 312/293.1 |

* cited by examiner

*Primary Examiner* — Sanh Phu

(74) *Attorney, Agent, or Firm* — Tracy M Heims; Apex Juris, Pllc

(57) ABSTRACT

To provide the case for an electronic device where the device is equipped with the camera and the flash that are adjacent to each other. The case has at least one hole in the case body to expose the camera and the flash. The camera hole has a depth and is formed by a cylindrical wall, and the shading area is provided on the hole wall.

3 Claims, 6 Drawing Sheets

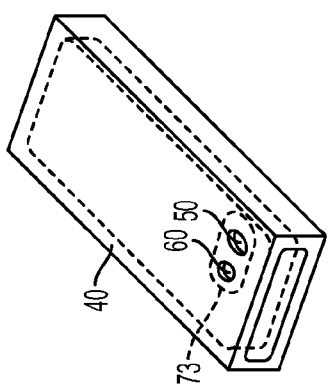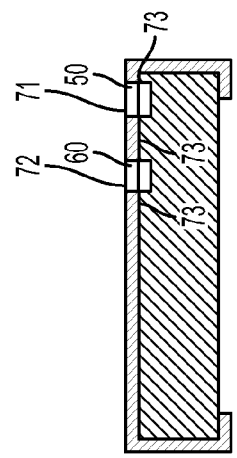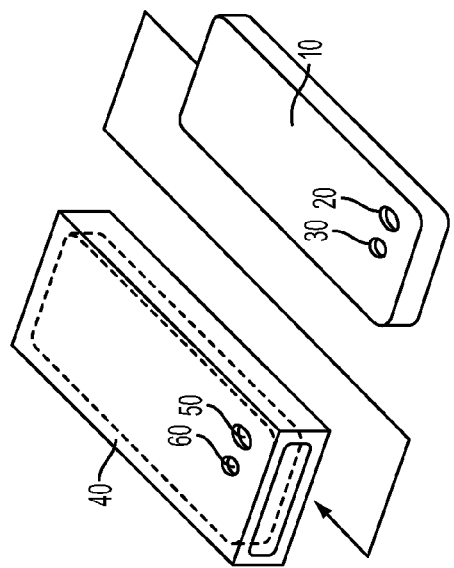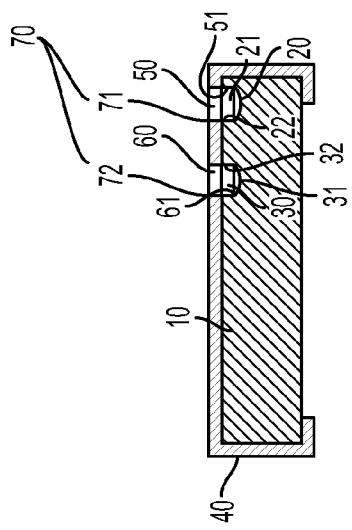

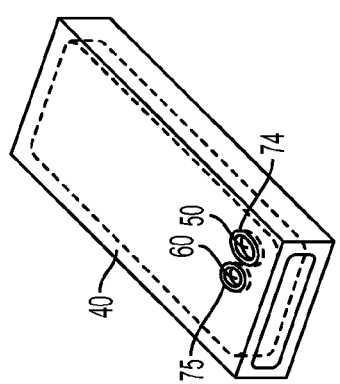
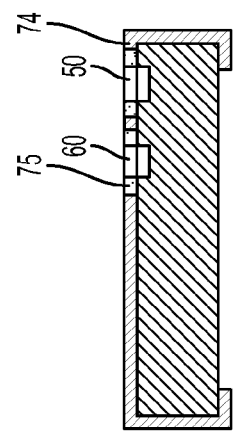
FIG. 5
FIG. 6
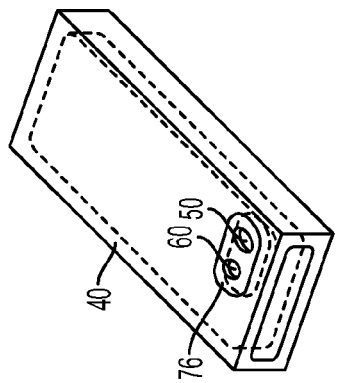
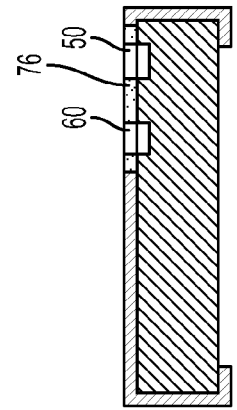
FIG. 7
FIG. 8

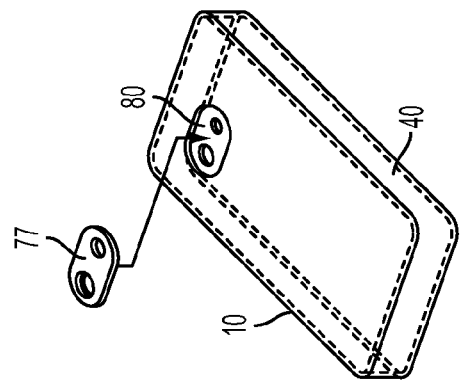
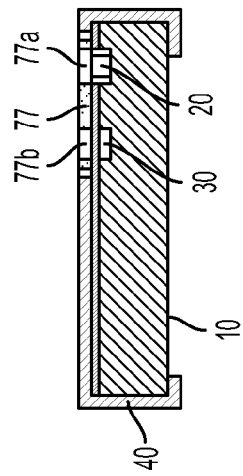
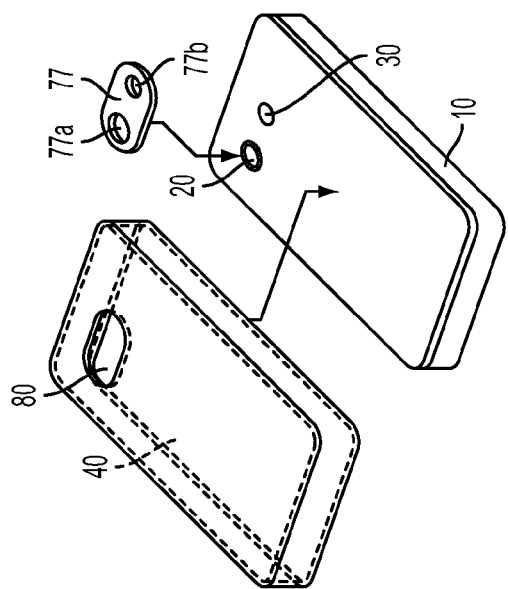
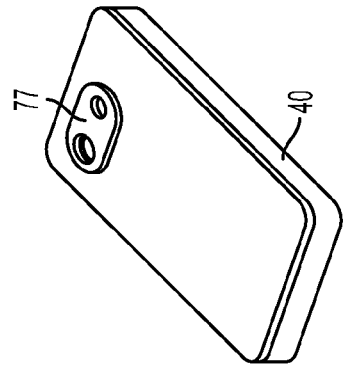

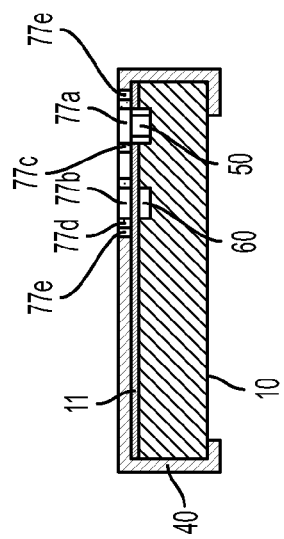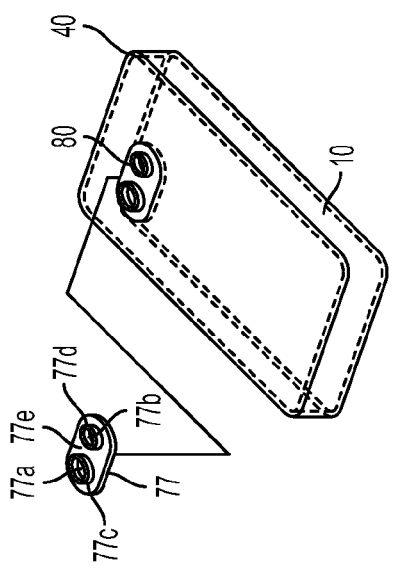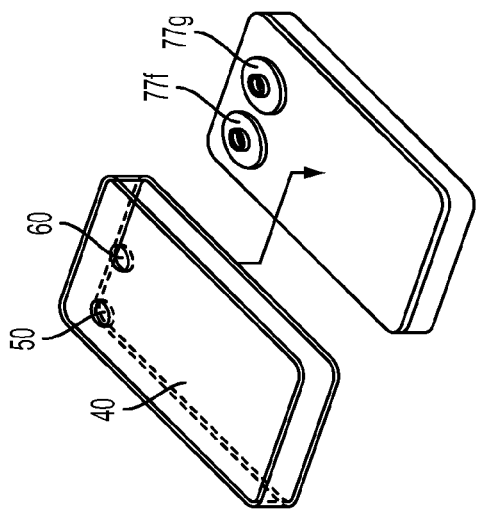

CASE FOR AN ELECTRONIC DEVICE

CROSS-REFERENCE TO RELATED APPLICATION(S) AND CLAIM OF PRIORITY

The present application claims the benefit under 35 U.S.C. section 119(a) of Japanese Utility Model Applications filed in the Japan Patent Office on Jun. 28, 2010 and assigned serial number 2010-4757, Jul. 2, 2010 and assigned serial number 2010-4899, and Jul. 9, 2010 and assigned serial number 2010-5065, the disclosure of which is incorporated herein by reference.

FIELD OF INVENTION

This invention relates to a case for an electronic device, more specifically, a case for an electronic device equipped with a camera unit and a flash.

BACKGROUND OF THE INVENTION

Various types of cases have been designed mainly to enclose and protect electronic devices, especially, portable electronic devices such as mobile phones and portable music players. The cases can protect the devices from being scratched and cracked.

The electronic devices could have many different buttons or control devices, such as touch screen panel, back panel with a camera and a flash, a volume control button, and a power switch. The cases must be designed to fit and cover the device without hindering each button or switch, or without impeding any function operatable from the device surface.

For example, for a device with a camera lens and a flash equipped on the back panel, the case must have at least one hole in appropriate size to not become an obstacle for taking pictures and using the flash. The camera lens and flash hole should be aligned to keep [[a]] the camera lens and flash portions open and clear and at the same time should be small enough to not expose any unnecessary or enlarged openings, thus providing for both better appearance and for better device protection.

Because of the size of the device, the camera lens and flash are often positioned close to each other. In many instances the camera lens and flash are located on an approximately flat back panel of the device. The flash and camera lens each can be positioned at a bottom of a cylindrical hole below the back panel surface, so that the back panel has an approximately level surface. In this structure, when the back panel surface is translucent with or without color, the flash light emitted spreads out on the back panel surface, and the cylindrical or conical wall surrounding the camera lens is designed to prevent the flash light from reflecting back into the camera area in order to prevent any adverse effect on the resultant picture taken. However, when the device is covered by the translucent case, the flash light tends to travel through the case and then reflects on an edge surface of the camera lens hole of the case. When this happens the flash light causes an adverse effect on the resultant picture.

SUMMARY OF THE INVENTION

The above-object of this invention can be solved by providing a shading treatment to the case for the electronic device with the camera and flash. The shading treatment can be used around the camera lens and flash hole on the device case, thereby creating the shading area. The shading area can be provided at least on the internal circumferential wall of the hole. When the case has two separate holes for the camera lens and the flash, the shading area can be provided to either one of the holes or both holes in order to have a greater effect. The hole is generally in a cylindrical or conical shape, and the shading treatment should be applied on the internal circumferential wall of the hole. The shading area can be extended to the back surface, or the device contacting surface, of the case and propagates out from the camera lens and flash holes. The shading area may be formed by applying the shading color paint or applying the paint material that gives the shading effect.

Another aspect of this invention is to provide the case where the shading area has at least one shading member, which is partially or entirely made of the shading material that gives the shading effect or is coated by the shading color paint or the paint material that gives the shading effect. This shading member can be separately and individually manufactured and then integrated into the case, or it may be integrally manufactured together with and on the case, around the camera lens hole or the flash hole.

Another aspect of this invention is to provide the case where the case has at least one hole exposing the camera lens and the flash of the device and the shading area comprises at least one detachable shading piece, approximately matching the hole. The detachable shading piece has at least one opening to expose the camera lens and the flash, and the detachable shading piece is partially or entirely made of the shading material that gives the shading effect, or is coated by the shading color paint or the paint material that gives the shading effect. The detachable shading piece is a cylindrical or conical ring shape. Also, the shading area can be the sticker partially or entirely made of the shading material that gives the shading effect or is coated by the shading color paint or the paint material that gives the shading effect.

BRIEF DESCRIPTION OF THE DRAWINGS

The above and other objects of the present invention will become readily apparent by reference to the following detailed description when considered in conjunction with the accompanying drawings wherein:

FIG. 1 is a perspective view of the case with a separate camera lens hole and flash hole and the device for the case installation;

FIG. 2 is a cross section view of the case of FIG. 1 showing the shading areas;

FIG. 3 is a perspective view of the case with the back surface shading area covering both camera lens hole and flash hole;

FIG. 4 is a cross section view of the case of FIG. 3;

FIG. 5 is a perspective view of the case with the shading part around the circumference of the camera lens and flash hole;

FIG. 6 is a cross section view of the case of FIG. 5;

FIG. 7 is a perspective view of the case with the shading part in a larger area including both camera lens hole and flash hole;

FIG. 8 is a cross section view of the case of FIG. 7;

FIG. 9 is a perspective view of the case with the case, the detachable shading piece, and the device;

FIG. 10 is a perspective view of the case with the detachable shading piece attached on the device;

FIG. 11 is a perspective view of the case with the detachable shading piece to be attached in the device with the cover;

FIG. 12 is a cross section view of the device with the shading piece of FIG. 11;

FIG. 13 is a perspective view of another type of detachable shading piece;

FIG. 14 is a cross section view of the device with the shading piece of FIG. 14;

FIG. 15 is a perspective view of another type of detachable shading piece;

DETAILED DESCRIPTION OF THE PREFERRED EMBODIMENT

Figure 16:
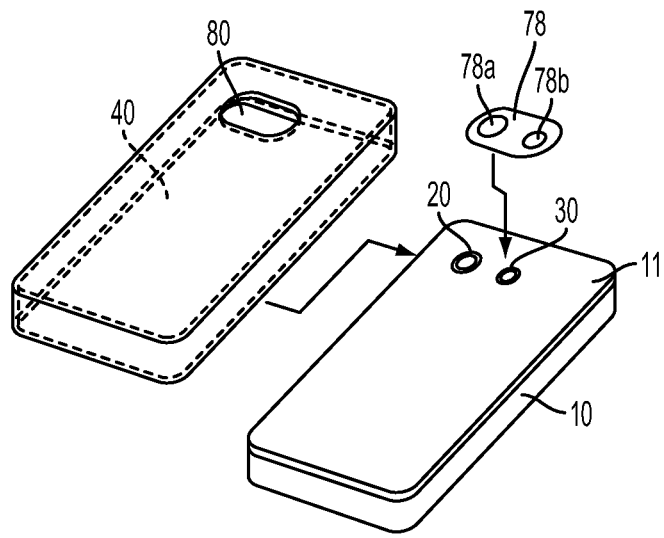
FIG. 16 is a perspective view of the case, the device and the shading sticker.

In the following paragraphs, this invention and preferred embodiments will be explained with reference to the drawings.

First Embodiment

FIGS. 1-4 illustrate the first embodiment of this invention. FIG. 1 is the perspective view of a case 40 with a camera lens hole 50 and a flash hole 60 and FIG. 2 is a cross section view of the case 40 of FIG. 1 showing shading treatment 70.

An electronic device 10 for which the case 40 of this invention is used has a cylindrical camera lens unit 20 and a cylindrical flash unit 30. The case 40 covers the electronic device 10 for various purposes such as protecting the device from damage and decorating the device 10 for a user's preference. The case 40 needs to have an opening or openings to expose the camera lens unit 20 and the flash unit 30 without obstruction so as to take a clear picture. FIG. 1 discloses the individual camera lens hole 50 and flash hole 60 in the case 40. The case 40 fits on the device 10 and the camera lens hole 50 and the flash hole 60 correspond accurately with the camera lens unit 20 and the flash 30 respectively on a back panel 11 of the device 10. When properly installed the camera lens hole 50 and the flash hole 60 are positioned to completely and accurately expose the camera lens unit 20 and the flash unit 30 without obstruction.

FIG. 2 is a cross section view of the case 40 fitting and partially enclosing the device 10. The case 40 in FIG. 2 shows the shading treatment 70 divided into two areas, i.e., a camera shading coating 71 and a flash shading coating 72. The camera shading coating 71 is a shade treated area created by forming a shading layer on a surface of a first cylindrical case wall 51 of the camera lens hole 50. The flash shading coating 72 is a shade treated area created by forming a shading layer on a surface of a second cylindrical case wall 62 of the flash hole 60. The shading treatment 70 here may be established by shade coating such as by applying shading color paint or coating with shading materials. The shading material may include metal, material with shading color, and any material by itself or mixture thereof providing shading effects. The camera lens unit 20 and the flash unit 30 are closely positioned, and when the flash 30 emits light, the light spreads out on the back panel 11 of the device 4. However, the camera lens 21 is located at a bottom part of the cylindrical camera lens unit 20, and the cylindrical wall 22 thereof prevents the flash light from traveling to the camera lens 21. However, when the translucent case 4 is on the device 10, the flash light emitted from the flash 30 hits the case 40 and spreads out thereon to adversely affect the resultant image taken by the camera lens. Even if the case is made of non-translucent rubber and plastics, the flash light reflects upon the case and then upon the cylindrical surface of the camera lens unit 20, which causes an adverse effect on the picture. The flash shading treatment 70 minimizes this negative light spreading to the camera lens unit 20 when the light is emitted from the flash 30.

FIG. 3 is a perspective view of the case 40 with a cover back surface shading coating 73 covering both camera lens hole 50 and flash hole 60. FIG. 4 is a cross section view of the case 40 of FIG. 3. Shapes and sizes of the shading area are not limited, and an additional back surface shading area 73 can extend from a camera shading part 74 and a flash shading part 75 to form the back surface shading area 73 which is located on a back surface of the case 40 around the holes 50 and 60. This extra shading area further minimizes the traveling of the flash light emitted from the flash 31 to the camera lens 21, especially through any gap between the back surface of the case 40 and the back panel 11 of the device 10.

Second Embodiment

A second embodiment will be explained with reference to FIGS. 5-8. FIG. 5 is a perspective view of the case 40, which shows individual holes for the camera lens unit 20 and the flash unit 30 which are covered by a camera shading part 74 and a flash shading part 75 respectively. The shading parts 74, 75 can be short cylindrical holes and can be made of the shading material. Alternatively, the shading parts 74, 75 can be coated or painted with the shading material. The finished shading surface is preferably a matted surface to minimize the flash reflection. As shown in FIG. 6, a back surface of the case 40 should be level with the bottom of the shading parts 74, 75 so as to not damage the device 10. The shading parts 74, 75 can be integrated with the case 40 either after individually manufactured or integrated simultaneously by insertion.

FIG. 7 is a perspective view of the case 4 with one large shading part 76 covering both the camera lens hole 50 and the flash hole 60 instead of having the two individual shading parts 74, 75. FIG. 8 is a cross section of FIG. 7. All other characteristics are the same and the explanation of which will be omitted.

Third Embodiment

A third embodiment will be explained with reference to FIGS. 9-15. This example is the same as the second embodiment except that a shading part is detachable from the case 40. FIG. 9 is a perspective view of the case 40, showing a detachable, large shading piece 77, and the device 10, and FIG. 10 is a perspective view of the case 40 with the detachable, large shading piece 77 installed. The case 40 has an elongated hole 80, and the area thereof should be sufficient to cover the camera lens unit 20 and the flash unit 30. The detachable large shading piece 77 is made of or coated with the shading color or the shading material and is shaped to match the elongated hole 80 to fit therein. As shown in FIG. 11, the detachable large shading part 77 can be attached on the device 10, temporarily or permanently fixing with the case 40 around the camera lens hole 50 using a mechanism such as an adhesive, snapping, fastenering, or clipping. The cross section view of FIG. 12 shows that the detachable large shading piece 77 has a cylindrical camera hole 77a and a cylindrical flash hole 77b which are aligned to be placed over the camera lens unit 20 and the flash unit 30. The detachable large shading part 77 can be partially or entirely coated with the shading paint or shading material or can be made by the shading material.

As shown in FIGS. 13-15, a shading piece camera cylindrical wall 77*c* and a shading piece flash cylindrical wall 77*d* can project from the detachable large shading part 77. FIG. 13 shows the cylindrical holes raising and projecting from a shading piece surface 77*e* of the shading part 77, and FIG. 14 is a cross section of FIG. 13. Alternatively, as shown in FIG. 15, the shading part 77 can be separated into a detachable camera shading part 77*e* and a detachable flash shading piece 77*g*. Obviously, the shapes and sizes of the elongated hole 70 can be selected according to each device and needs.

Fourth Embodiment

Figure 17:
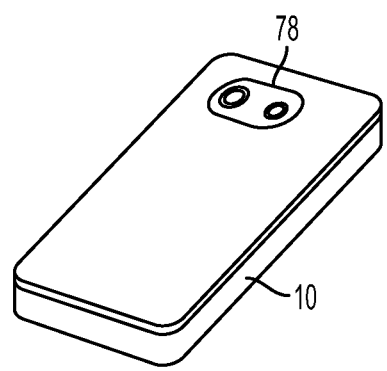
FIG. 17 is a perspective view of the shading sticker on the device.
Figure 18:
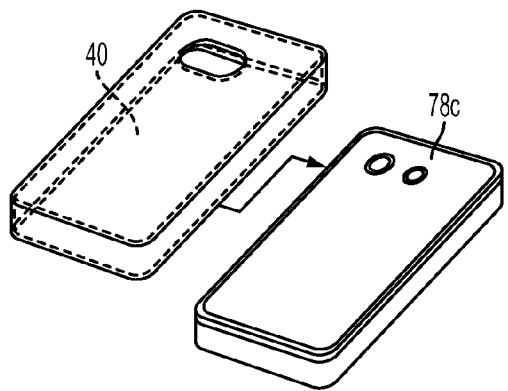
FIG. 18 is a perspective view of the case, the device and another type of shading sticker.
Figure 19:
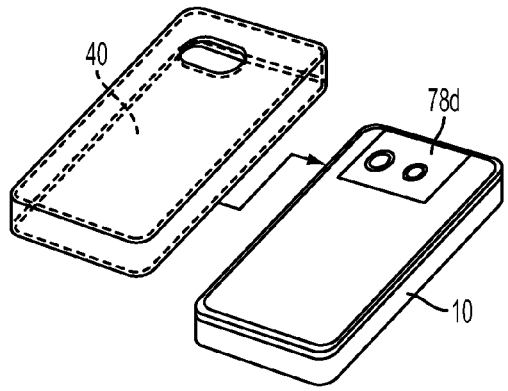
FIG. 19 is a perspective view of the case, the device and another type of shading sticker.
Figure 20:
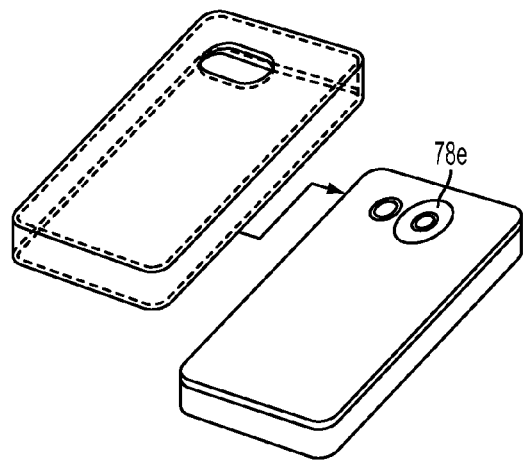
FIG. 20 is a perspective view of the case, the device and another type of shading sticker.

FIGS. 16-20 show another embodiment of the present invention. In this embodiment, a shading sticker 78 is used instead of the shading area or shading parts in the previous embodiments. FIG. 16 is a perspective view of this embodiment with an oval shading sticker with openings for the camera lens and the flash; FIG. 17 is a perspective view of the device with the shading sticker 80 on the device panel around the camera lens and flash; FIG. 18 is a cross section view of the device 40 with the sticker 80 covering almost the entire back panel 11 of the device; and FIG. 19 is a perspective view of the case, the device and another square type of shading sticker; and FIG. 20 is a perspective view of the case, the device and another circular type of shading sticker. Sizes and shapes of the shading sticker 80 can be decided depending upon needs.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What I claim is:

1. A case for a mobile phone where said mobile phone is equipped with a camera, a camera lens, and a flash where said camera lens and said flash are adjacent to each other, comprising:
    a case body to at least partially enclose said mobile phone;
    at least one hole in said case body to expose the adjacent camera lens and flash, wherein
    a shading area is provided on said at least one hole wall to minimize flash bounce, wherein
    said shading area comprises at least one detachable shading piece approximately matching said at least one hole,
    said detachable shading piece has two separate openings to expose the camera and the flash, and
    said detachable shading piece is partially or entirely made of a shading material that gives a shading effect or is coated by a shading color paint or a paint material that gives a shading effect.

2. The case for a mobile phone according to claim 1, wherein the two holes of said detachable shading piece are cylindrical ring shaped.

3. The case for a mobile phone according to claim 2, wherein
    said shading piece is also conical, where said conical shape has a smaller circumference at said case body inner side and a larger circumference at said case body outer side.

* * * * *